2,867,674

PROCESS FOR PRODUCTION OF PARA-(TERTIARY ALKYLATED)-ALKYLBENZENES

Seymour H. Patinkin, Chicago, and Robert A. Sanford, Park Forest, Ill., assignors to Sinclair Refining Company, New York, N. Y., a corporation of Maine No Drawing. Application October 25, 1955
Serial No. 542,778

3 Claims. (Cl. 260—671)

Our invention relates to the production of para-(tertiary-alkylated)-alkylbenzenes by the selective reaction of alkylbenzenes and tertiary olefins, or tertiary olefin producing compounds, in the presence of a catalyst comprising sulfuric acid.

Prior processes for the tertiary-alkylation of alkylbenzenes have produced a mixture of the para-(tertiary-alkyl) alkylbenzene and the meta-isomer. For example, prior art processes for the production of para-(tertiary-butyl)-toluene have produced a mixture of about 93 percent para-isomer and about 7 percent of the meta-isomer. The meta-isomer is extremely difficult to remove from such a mixture. For certain uses, however, the para-isomer must be utilized in pure form. For example, para-(t-butyl)-toluene can be oxidized to terephthalic acid by means of dilute aqueous nitric acid of a strength up to about 40 percent at a temperature of at least about 450° F. as described and claimed in pending application Serial No. 550,829, filed December 5, 1955, now abandoned, of Emmett H. Burk, Jr. High purity para-isomer produces a terephthalic acid of particular value in the fiber field where singleness of composition is critical. It has been assumed, however, that the 93 percent para- and 7 percent meta-isomer distribution was a limiting value.

We have found that para-(tertiary-alkylated)-alkylbenzenes are obtained in a purity in excess of about 98% and containing 2% or less of the meta-isomer by reacting the alkylbenzene with a tertiary olefin, or a tertiary olefin producing substance, in the presence of a catalyst comprising sulfuric acid while controlling the temperature at a low range, i. e. about −20 to 5° C. Thus, we have found that para-(tertiary-butyl)-toluene is produced in a purity in excess of about 98% and containing 2% or less of the meta-isomer by reacting toluene with isobutylene in the presence of a catalyst comprising sulfuric acid while controlling the temperature at about −20 to 5° C.

The process of our invention provides a selective reaction in which valuable para-(tertiary-alkylated)-alkylbenzenes are obtained in good yields and in higher purity than before. The high purity para-isomers are useful in the preparation of valuable compounds such as terephthalic acid which is useful in the production of fibers.

According to the process of our invention, a monoalkylbenzene is reacted with a tertiary olefin in the presence of a catalyst comprising sulfuric acid while controlling the temperature between about −20 to 5° C. At higher temperatures, less pure para-isomer is obtained and at lower temperatures conversion rates decrease sharply. The reaction is stopped, for example, by quenching with water, the product washed with water or alkali solution, dried and the products recovered by distillation.

Generally, the catalyst and monoalkylbenzene are mixed and contacted with the tertiary olefin. The manner of contacting is important in that isomerization of the alkylate can occur while the addition of the olefin to the catalyst and aromatic mixture is being completed resulting in lower para-isomer yields. For example, prolonged contact of the alkylate from toluene and isobutylene with the catalyst causes the alkylate to isomerize and approach the equilibrium distribution of about 67 percent meta- and 33 percent para-(t-butyl)-toluene. We have found that keeping the olefin concentration low during alkylation and keeping additional contact time after olefin addition to a minimum avoids this undesirable isomerization and results in the production of high yields of high purity para-isomer. Thus, slow addition of the olefin, early quenching of the reaction and early removal of alkylate from contact with the catalyst is preferred procedure. Advantageously, two streams, one containing alkylbenzene and the olefin and the other alkylbenzene and catalyst, are directed into a mixing chamber and after a short contact time discharged into a stream of water to stop the reaction. The molar ratio of alkylbenzene to olefin to catalyst may vary from about 2–5:0.5–1.5:0.5–1.5. Preferably the ratio is about 4:1:1.0. A minimum of catalyst is employed as this produces higher purity para-isomer. Large amounts of catalyst increase meta-isomer formation. The product is recovered by alkali washing and distillation.

The monoalkylbenzenes useful in the process of our invention are those in which the alkyl group contains from 1 to 3 carbon atoms, for example, toluene, ethyl benzene and isopropyl benzene. The tertiary olefins useful in the process of our invention are those containing 4 to 5 carbon atoms, for example, isobutylene and isoamylene. By the term tertiary olefin as used herein we also mean to include olefin producing substances such as the alkyl halide, alcohol, ether or ester of the corresponding tertiary olefin. For example, t-butyl chloride and t-amyl chloride, t-butyl alcohol and t-amyl alcohol, t-butyl ether and t-amyl ether, and t-butyl acetate and t-amyl acetate, are useful.

Concentrated sulfuric acid is preferred as the catalyst and concentrations of about 96 to 100 percent are preferred. Less concentrated acid promotes undesirable polymerization at the expense of alkylation.

The process of our invention will be further illustrated by the following example in which toluene is tertiary-butylated with isobutylene in the presence of sulfuric acid as a catalyst using the following procedure.

The reaction is performed in a glass four-necked fluted flask equipped with a stirrer, thermometer and gas inlet tube. 96% sulfuric acid is used. The olefin is introduced from a small bomb metered through a Fischer-Porter "Flowrator" and dried in a $CaCl_2$ drying tower. The weight of isobutylene added to the reaction mixture is determined by the weight loss of the isobutylene bomb. A bath cooled with Dry Ice-isopropanol is used to control reaction temperature. 92 grams of the 96% sulfuric acid is added to 368 grams of toluene while maintaining the temperature below 0° C. and to this stirred mixture, 56 grams of isobutylene is metered in under the surface of the layer of the liquid over the course of one hour. The hydrocarbon layer is separated and washed with water and caustic solution. The hydrocarbon layer is fractionated to recover a 95 percent conversion of the olefin to tertiary-butyl toluene containing 98.2% of the para isomer and 1.8% of the meta isomer.

We claim:

1. A method for the production of para-(tertiary-alkylated)-alkylbenzenes which comprises reacting a mono-alkylbenzene in which the alkyl group contains from 1 to 3 carbon atoms with a tertiary olefin containing from 4 to 5 carbon atoms in the presence of a catalyst comprising sulfuric acid while controlling the temperature at about −20 to 0° C. and the molar ratio of alkylbenzene to olefin to catalyst at about 2–4:0.5–1.5:0.5–1, respectively.

2. The method of claim 1 in which the alkylbenzene is toluene.

3. A method for the production of para-(tertiary-butyl)-toluene which comprises reacting toluene with isobutylene in the presence of a concentrated sulfuric acid catalyst while controlling the temperature at about −20 to 0° C. and the molar ratio of toluene to isobutylene to catalyst at about 2–4:0.5–1.5:0.5–1, respectively.

References Cited in the file of this patent

Ipatieff et al.: Journal of the American Chemical Society, vol. 58, pp. 919–922 (1936).

Nightingale: Chemical Reviews, vol. 25, pp. 329–376 (1939). (Pages 335 and 336 only relied on.)

Welsh et al.: Journal of the American Chemical Society, vol. 63, No. 10, October 1941, pp. 2603 and 2604.

UNITED STATES PATENT OFFICE
CERTIFICATE OF CORRECTION

Patent No. 2,867,674                                January 6, 1959

Seymour H. Patinkin et al.

It is hereby certified that error appears in the printed specification of the above numbered patent requiring correction and that the said Letters Patent should read as corrected below.

Column 3, lines 1 and 10, for "2-4:0.5-1.5:0.5-1" each occurrence, read -- 2-5:0.5-1.5:0.5-1.5 --.

Signed and sealed this 23rd day of June 1959.

(SEAL)
Attest:

KARL H. AXLINE                                ROBERT C. WATSON
Attesting Officer                                Commissioner of Patents